Dec. 16, 1958

E. W. PAULSEN 2,864,227

GRAIN WINDROWER

Filed Nov. 30, 1955

INVENTOR.
Earl W. Paulsen
BY
*Sam J. Slotsky*
ATTORNEY

United States Patent Office

2,864,227
Patented Dec. 16, 1958

2,864,227

GRAIN WINDROWER

Earl W. Paulsen, Round Lake, Minn.

Application November 30, 1955, Serial No. 550,004

4 Claims. (Cl. 56—192)

My invention relates to a grain windrower.

An object of my invention is to provide a grain windrower which carries the grain on traveling belts centrally and thence deposits the cut grain into a swath or windrow, with the stalks of grain being disposed angularly and being wider spread at one end to provide more uniform depositing of the cut grain and readier drying.

A further object of my invention is to provide a device which eliminates the need for canvas belts which usually wear considerably, and to thus provide a more permanent structure.

Figure 1:
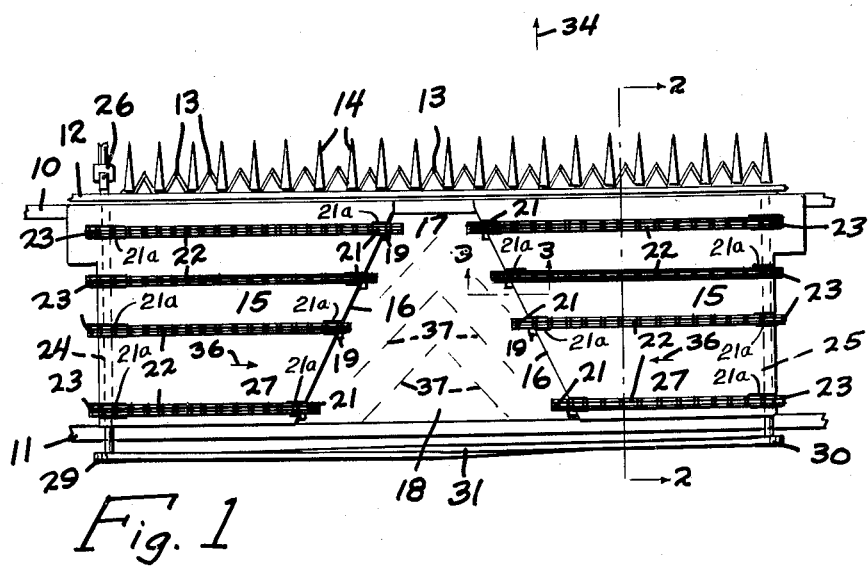
Figure 2:
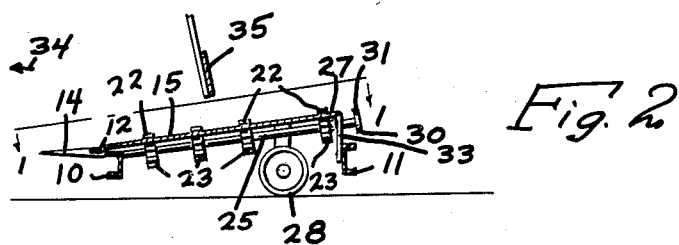
Figure 3:
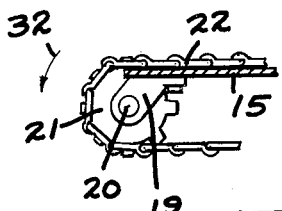

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of Figure 2 looking downwardly along the lines 1—1 of Figure 2, Figure 2 is a sectional view taken generally along the lines 2—2 of Figure 1, and Figure 3 is an enlarged sectional view taken along the lines 3—3 of Figure 1.

My invention contemplates the provision of a windrower machine which will operate in combination with the usual sickle arrangement which cuts the grain, the device having the advantages mentioned hereinabove.

I have used the character 10 to designate a forward framework portion of the windrower, the character 11 indicating a rear framework portion, and it should be understood herein that I will show only the necessary parts of my invention, it being understood that the various driving members and the like will be present as in usual practice.

Attached forwardly of the framework member 10 is the bar 12 which operates the sickle blades 13 which reciprocate within the guards 14.

Suitably attached to the forward framework member 10 are a pair of sheet metal members 15 each of which includes the rearwardly diverging side edges 16, thereby leaving a smaller opening at 17, and a much wider rear opening at 18. Journalled in suitable bearings 19 (see Figure 3) by means of the short stub shafts 20 are the spaced sprockets 21 over which sprockets pass the link chains 22, these chains passing over further sprockets 23 which are secured to the shafts 24 and 25, and attached to the shaft 24 is a universal joint 26 which will allow articulation of the shaft 24 and which will allow driving engagement with the shaft 24 from any suitable power source from the tractor or other device which draws the windrower.

The shafts 24 and 25 are suitably journalled within bearings (not shown) which are secured beneath the members 15 and these shafts also pass through the forward members 10.

The rear portions 27 of the members 15 are at a higher elevation than the forward members as shown in Figure 2, thereby providing a slope to the members 15, which provides means for causing the normally upper ends of the grain to drop more quickly through the opening and also provides more room for the supporting wheels such as 28 which can be secured in any desired manner to the framework, only one of said wheels 28 being shown.

It will be noted that the upper three chains 22 at either side of the arrangement are practically the same distance apart, and the lower-most chain as viewed from Figure 1 is at a substantially greater distance. This provides means whereby the shorter grain can be conveyed on the upper chains and the longer grain can be thereby conveyed by all of the chains, this arrangement therefore not requiring an intermediate pair of chains above the lower-most chains.

Attached to the shaft 24 is a pulley 29, and attached to the shaft 25 is a further pulley 30, and engaging the pulleys 29 and 30 is a belt 31 which is twisted or crossed over so as to cause the sprockets 21 to rotate in the direction of the arrow 32 (see Figure 3) toward the centrally positioned opening thus provided. The upper portions 27 of the members 15 can be supported by brackets 33 or in any desired manner, and it should be specifically understood that any type of attachments or supporting means can be provided without departing from the essential spirit of my invention.

It will now be noted that as the device travels forwardly in the direction of the arrow 34, the sickle blades which are operated in the usual manner, will cut the grain which will fall onto the members 15, the character 35 in Figure 2 disclosing one of the rotating slats on the reel. The chains will be driven through the connections described in the direction of the arrows 36 or toward the central opening, and it will be noted that due to the particular divergence of the sprockets 21, the grain will occupy an angular position shown by the dotted lines 37, whereby the windrow will be spread out along the grain ends, thereby providing the additional advantage of quicker drying, it being also noted that the sprockets 21 will tend to carry the grain downwardly through the opening. It should be understood that there could be any angle of inclination of the edges 16 as desired. The various sprockets can partially ride in suitable slots 21a cut in the members 15.

Any type of chain can be employed, it being noted that these chains thereby convey the cut material toward the central opening thus provided, and it being further noted that no canvas belts are required in this construction, whereby the arrangement will require very little attention by the operator.

It will now be seen that I have provided the advantages mentioned in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A grain windrower comprising a pair of horizontally spaced rigid platforms, a plurality of spaced flexible endless members passing over said platforms adapted to carry cut grain toward the space between said platforms, said platforms having rearwardly diverging side edges to provide a wider rear opening in said space and a narrower forward opening therein, said windrower including a forward sickle cutting attachment, said wider rear opening causing grain cut by said sickle cutting attachment to fall to a spread angular position.

2. A grain windrower comprising a pair of horizontally spaced rigid platforms, a plurality of spaced sprocket chains passing over said platforms adapted to carry cut grain toward the space between said platforms, said platforms having rearwardly diverging side edges to provide a wider rear opening in said space and a narrower forward opening therein, said windrower including a forward sickle cutting attachment, said wider rear opening causing grain cut by said sickle cutting attachment to fall to a spread angular position, said platform being upwardly inclined rearwardly.

3. A grain windrower comprising a pair of horizontally spaced rigid platforms, a plurality of spaced sprocket chains passing over said platforms adapted to carry cut grain toward the space between said platforms, said platforms having rearwardly diverging side edges to provide a wider rear opening in said space and a narrower forward opening therein, said windrower including a forward sickle cutting attachment, said wider rear opening causing grain cut by said sickle cutting attachment to fall to a spread angular position, said platform being upwardly inclined rearwardly, sprockets engaging said sprocket chains, shafts for driving said chains inwardly and simultaneously toward said space, further sprockets journalled along said diverging side edges engaging said sprocket chains.

4. A grain windrower comprising a pair of horizontally spaced rigid platforms, a plurality of spaced sprocket chains passing over said platforms adapted to carry cut grain toward the space between said platforms, said platforms having rearwardly diverging side edges to provide a wider rear opening in said space and a narrower forward opening therein, said windrower including a forward sickle cutting attachment, said wider rear opening causing grain cut by said sickle cutting attachment to fall to a spread angular position, said platform being upwardly inclined rearwardly, sprockets engaging said sprocket chains, shafts for driving said chains inwardly and simultaneously toward said space, further sprockets journalled along said diverging side edges engaging said sprocket chains, the rearmost of said sprocket chains being spaced at a greater distance than the spacing between the forward sprocket chains.

References Cited in the file of this patent

UNITED STATES PATENTS

| | | |
|---|---|---|
| 23,878 | Wood | May 3, 1859 |
| 688,330 | Peek | Dec. 10, 1901 |
| 885,157 | Hovland | Apr. 21, 1908 |
| 1,996,230 | Gilliand | Apr. 2, 1935 |
| 2,677,225 | Ommodt | May 4, 1954 |